Patented Aug. 4, 1953

2,647,887

UNITED STATES PATENT OFFICE 2,647,887

METHOD FOR THE STABILIZATION OF SULFUR DIOXIDE-RUBBERY POLYMER PRODUCTS

Johan Michael Goppel, Amsterdam, Netherlands, assignor to Shell Development Company, San Francisco, Calif., a corporation of Delaware No Drawing. Application December 16, 1949, Serial No. 133,488. In the Netherlands December 29, 1948

3 Claims. (Cl. 260—79.3)

This invention is directed to a process for the stabilization of products formed on reacting sulfur dioxide with a rubbery polymer, as well as to the improved compositions so obtained. In brief, stabilization of these reaction products is obtained by incorporating free sulfur therein.

The term "rubbery polymer" is employed hereing to designate those compounds which are polymers of at least one compound selected from the group consisting of conjugated diolefins and chloroprene. These polymers, which have a molecular weight of 5000 or more and contain a plurality of unsaturated linkages of aliphatic character in the molecule, may be homopolymers or copolymers of compounds within the aforesaid group, or they may be copolymers formed between the compounds of that group and other compounds polymerizable therewith. Representative rubbery polymers are, for example the various natural rubbers, such as latex, crepe, sheet, caoutchouc, gutta percha, balata, and cyclo rubbers, for example; synthetic rubbery copolymers and homopolymers such as those formed from butadiene, dimethyl butadiene, pentadiene, and/or chloroprene (neoprene synthetic rubber); and synthetic rubbery copolymers such as those formed between butadiene and either vinyl acetylene, isobutylene (Butyl synthetic rubber), vinyl chloride, acrylic acid, acrylonitrile (Buna N), methacrylic acid, styrene (Buna S), acrolein, methyl isopropenyl ketone, or vinyl ether.

It is known that while the various rubbery polymers may themselves be formed into filaments and other useful shapes, a material of much greater utility for this purpose is obtained by reacting said polymers with sulfur dioxide. While the exact nature of this reaction is not understood, it is evident that the same involves a fundamental modification of the molecular structure, with substantial quantities of sulfur dioxide being taken up by the rubbery polymer in one form or another. Under normal circumstances, however, natural rubber and the other rubbery polymers described above are slow to react with sulfur dioxide, and if materials of high purity are used, substantially no reaction at all occurs in most instances. This low reaction rate is especially disadvantageous in filament forming operations where the normal practice is to extrude a solution of the rubbery polymer into a coagulating bath containing dissolved sulfur dioxide where the polymer reacts with sulfur dioxide to form an insoluble filamentary shape which is continuously withdrawn from the bath. In such operations the filaments remain in the coagulating bath for but a short interval of time, and unless the polymer receives a previous "activation" treatment, any reaction with sulfur dioxide which does occur will be confined to the surface areas of the filaments. Fortunately, it is now known that such activation may be affected by adding a hydroperoxide or other activating agent to the rubbery polymer solution, the polymer then being capable of instantly reacting with relatively large amounts of sulfur dioxide as it is spun into the coagulating bath. The resulting filaments are uniform in quality and even the most deep-seated portions thereof have substantially the same content of molecularly bound sulfur dioxide as do the outer portions.

While the reaction products discussed above have proven well adapted for many applications, they are particularly useful when formed into filaments of the type which can be woven into textiles, either alone or in conjunction with fibers of other materials. Thus, filaments produced by spinning a hydroperoxide-activated solution of natural rubber into a sulfur dioxide-containing coagulating bath have a high elementary denier, good tensile strength, a high degree of elongation prior to rupture and good flexibility. In contrast with these many favorable qualities, however, the filaments suffer the disadvantage of undergoing rapid deterioration with age, heating and/or exposure to light. This deterioration is manifested in a variety of ways, but chiefly in a sharp falling off in tensile strength and in the degree of permissible stretch prior to rupture. Whatever the cause of deterioration, it has been observed that the same is accompanied by a loss of sulfur dioxide from the object, which loss is generally proportional to the aforementioned deterioration in physical properties. Accordingly, the rapidity with which a given product loses sulfur dioxide furnishes a convenient measure of its stability.

It is an object of the present invention to provide a method for obtaining products of the type formed on the reaction of rubbery polymers with sulfur dioxide, which products are highly resistant to deterioration on being aged, heated and/or exposed to light. A still further object is to provide filaments and like continuous, non-supported shapes composed of the aforementioned reaction products, which shapes are characterized by a continued high tensile strength and a high degree of stretch prior to rupture, as well as by a relatively small loss of sulfur dioxide, upon being aged, heated and/or exposed to light. The nature of still other objects of the invention will be apparent from the nature of the following description.

It has now been discovered that improved resistance to deterioration with age, heating and/or exposure to light rays may be imparted to rubbery polymer-sulfur dioxide reaction products by incorporating therein a small amount of free sulfur. While the sulfur may be introduced in any desired manner, it is essential that the same be evenly distributed throughout all portions of the said products and not just be present on their surface. In the preferred practice of this invention the sulfur, or a sulfur-containing compound capable of engendering free sulfur in the reaction product, is added to a solution of rubbery polymer before the latter is reacted with sulfur dioxide, for it is only in this manner that maximum stability of the reaction products can be achieved.

The sulfur may be added to the solution of rubber polymer either in the form of free sulfur or as a sulfur-containing compound which is capable of engendering free sulfur in the reaction product either by direct release or as a result of interaction with the sulfur dioxide component of the reaction product. Representative compounds which are capable of directly releasing sulfur in this fashion are, for example, ammonium polysulfide, diethyl sulfide, diethyl tetrasulfide, morpholine sulfide and morpholine pentasulfide. Other compounds of this same general character, particularly the organic sulfides and polysulfides, may be used provided that they do not deleteriously effect the quality of the rubbery polymer-sulfide dioxide product. As regards the sulfur-containing compounds which are capable of reacting with the sulfur dioxide component of the reaction product to produce free sulfur, hydrogen sulfide furnishes an outstanding example. Use of the latter compound is particularly desirable since not only does it react with the sulfur dioxide present within the body of the reaction product to produce free sulfur, but it also acts as a stabilizing ingredient in its own right.

The free sulfur and the sulfur-containing compounds of the types mentioned above may be added to the solution of rubbery polymer either singly or in any combination with one another, and in either the free state or dissolved in a suitable solvent, and all are effective even when present in extremely small amount. Thus, in the case of free sulfur, good results are obtained by adding the same to the rubbery polymer solution in amounts as small as 0.001%, though a preferred concentration range is from 0.01 to 1%, and even larger amounts than this may be employed without harmful effects. In the case of hydrogen sulfide, ammonium polysulfide, morpholine sulfide, and the other sulfur-containing additives, good results are obtained by using from about 0.01 to 2% thereof in the rubbery polymer solution with some benefit being obtained even with lesser amounts than 0.01%. These percentages are in terms of the weight of the rubber polymer solution.

Once the sulfur or the desired sulfur-containing compound has been added to the solution of rubber polymer along with an appropriate activating compound, as tetralin hydroperoxide or the like, the solution may thereafter be brought into reactive engagement with sulfur dioxide in any desired manner. Thus, when sulfur dioxide is introduced in either the gaseous, liquid or dissolved state into a solution of activated rubbery polymer which has been sulfur-treated in the manner of the present invention, there is produced a gel-like reaction product which can either be dried into a sheet or film or be used in the liquid condition in finishes of one type or another. On the other hand, when the rubbery polymer solution is spun or otherwise injected into a sulfur dioxide-containing coagulating bath, there are precipitated filamentary reaction products which can then be withdrawn from the bath and used. All these free sulfur-containing products are found to have good resistance against the deteriorating effects of heat, light and age.

The following examples illustrate the invention in various of its embodiments.

*Example I*

A 6.5% solution of natural rubber in toluene was activated by the addition of 1% tetralin hydroperoxide. The solution was then separated into a number of portions to which free sulfur was added in amounts of 0.001, 0.01, 0.1 and 1%, respectively, with another portion being retained as the control. All the solutions were then spun (i. e. extruded) into a coagulating bath maintained at —5° C. and consisting of a solution of 300 grams per liter of sulfur dioxide in ethanol and water (4:1 by volume). The extruded rubber instantaneously reacted with sulfur dioxide in the coagulating bath to produce insoluble filaments which were rapidly withdrawn from the coagulating bath, washed and dried. All of the dried filaments, which contained approximately 44% sulfur dioxide, were then given an accelerated deterioration treatment wherein they were heated at 125° C. for 1½ hours in air. This treatment occasioned a weight loss (as sulfur dioxide) of 0.57% in the case of the control filaments (which represented a reduction of from about 5 to 10% in tensile strength) and of 0.28%, 0.18%, 0.09%, and 0.07% in the case of the filaments which had been produced from solutions containing 0.001, 0.01, 0.1 and 1%, respectively, of free sulfur. The losses in tensile strength experienced by the free sulfur-containing filaments as a result of the heating treatment were at least 50% less than that which took place with the control.

*Example II*

The process of Example I was repeated using a portion of the tetralin hydroperoxide-containing rubber solution through which hydrogen sulfide was vigorously bubbled for several minutes. In this case the dried filaments lost but 0.09% of their weight (as sulfur dioxide) on being heated at 125° C. for 1½ hours, as compared to 0.57% in the case of the filaments produced without benefit of hydrogen sulfide addition.

*Example III*

In this operation, also conducted in the same manner as that described in Example I, but with the introduction of approximately 0.5% ammonium polysulfide into the tetralin hydroperoxide-activated rubber solution, it is found that the loss of sulfur dioxide from the filament during heating at 125° C. for 1½ hours is reduced to approximately 0.15%.

The various percentages expressed herein are on a weight basis.

The invention claimed is:

1. A process for preparing insoluble reaction products of sulfur dioxide and hydroperoxide activated rubbery polymers which products have increased resistance to deterioration, which consists of adding from 0.1% to 2% by weight of a sulfur compound of the group consisting of free sulfur and sulfur-containing compounds which engender deposition of free sulfur, to a solution of a hydroperoxide activated soluble rubbery polymer of a compound of the group consisting of conjugated diolefins and chloroprene so as to form a mixture of the said sulfur compound and the rubbery polymer, and then contacting the resulting mixture with sulfur dioxide at a temperature not in excess of about −5° C. so as to form an insoluble reaction product.

2. The process as defined in claim 1 wherein the sulfur compound added is free sulfur.

3. A process as defined in claim 1 wherein the sulfur compound added is hydrogen sulfide.

JOHAN MICHAEL GOPPEL.

References Cited in the file of this patent

UNITED STATES PATENTS

| Number | Name | Date |
| --- | --- | --- |
| 1,925,879 | Oenslager | Sept. 5, 1933 |
| 2,075,251 | Winkelmann | Mar. 30, 1937 |
| 2,115,053 | Winkelmann | Apr. 26, 1938 |
| 2,288,982 | Waterman | July 7, 1942 |
| 2,371,719 | Starkweather | Mar. 20, 1945 |
| 2,469,847 | De Nie et al. | May 10, 1949 |
| 2,481,596 | Irany et al. | Sept. 13, 1949 |

FOREIGN PATENTS

| Number | Country | Date |
| --- | --- | --- |
| 2,070 | Great Britain | of 1914 |